United States Patent [19]

Han

[11] Patent Number: 5,289,449

[45] Date of Patent: Feb. 22, 1994

[54] CIRCUIT FOR CONTROLLING OPTICAL PICKUP POSITION IN OPTICAL DISC APPARATUS AFTER POWER IS TURNED OFF

[75] Inventor: Yeon-tak Han, Suwon, Rep. of Korea

[73] Assignee: SamSung Electronics Co., Ltd., Suwon, Rep. of Korea

[21] Appl. No.: 826,457

[22] Filed: Jan. 27, 1992

[30] Foreign Application Priority Data

May 10, 1991 [KR] Rep. of Korea .................. 91-7585

[51] Int. Cl.⁵ ............................................. G11B 7/00
[52] U.S. Cl. ........................................ 369/53; 369/32; 369/199; 369/215; 369/56
[58] Field of Search ............... 369/44.11, 43, 44.27, 369/50, 53, 54, 112, 199, 195, 32, 56, 215; 318/560, 561

[56] References Cited

U.S. PATENT DOCUMENTS

| | | | |
|---|---|---|---|
| 4,839,881 | 6/1989 | Takahara et al. | 369/199 |
| 4,841,505 | 6/1989 | Aoyagi | 369/32 |
| 4,903,140 | 2/1990 | Okamoto et al. | 369/32 |
| 4,926,409 | 5/1990 | Tsuyuguchi et al. | 369/199 |

FOREIGN PATENT DOCUMENTS 315195A 5/1989 European Pat. Off. ............ 369/195

Primary Examiner—Aristotelis Psitos
Assistant Examiner—P. W. Huber
Attorney, Agent, or Firm—Robert E. Bushnell

[57] ABSTRACT

A circuit for controlling the optical pickup position in an optical disc reproducing apparatus is constructed such that when the power is applied, a user recognizes the position of the pickup which is used to pickup information from a disc with information recorded on both sides, by recognizing whether the pickup is facing the upward side or downward side of the disc. The circuit further controls the pickup to be positioned on the innermost circumference of the reproducing side in the reproducing stop or ending operation. Therefore, the time needed to recognize which the first reproducing side for successive reproducing is decreased, while reducing power consumption needed to move the pickup in the reproducing stop operation.

20 Claims, 3 Drawing Sheets

CIRCUIT FOR CONTROLLING OPTICAL PICKUP POSITION IN OPTICAL DISC APPARATUS AFTER POWER IS TURNED OFF

BACKGROUND OF THE INVENTION

The present invention relates to an optical disc reproducing apparatus, and particularly to a circuit for controlling the position of a pickup to reproduce information recorded on both sides of a disc.

Generally, most common optical disc reproducing apparatuses reproduce audio information recorded on one side of a disc. On the other hand, when video information is recorded together with audio information, the amount of recorded information doubles. Therefore, optical disc reproducing apparatuses are used in which information is recorded on both sides.

FIG. 1 shows sectional views of an example of a conventional pickup transfer for an optical disc reproducing apparatus, which centers around a disc 80 having information on both sides. It is assumed that the first reproducing side (side A) of the disc faces downward in FIG. 1A, and upward in FIG. 1B. Here, upward means that while seating disc 80, the user can see the side of the disc, and downward means the disc's side is unable to be seen and faces a spindle motor 50. With disc 80 situated as illustrated in FIG. 1A, the reproducing operation is performed as follows.

First, a reproducing command is applied to spindle motor 50 in order to rotate disc 80. Then, when the revolution speed becomes normal (e.g., 1800 rpm), a pickup 60 picks up the information recorded on disc 80. At this time, the movement of pickup 60 along a pickup transfer 1 is controlled by a feed motor 70. In other words, the transferring movement is controlled from the innermost circumference to the outermost circumference, and from the upward side to downward side and vice versa. When the outermost information on side A is picked up by such pickup movement control, feed motor 70 transfers pickup 60 along pickup transfer 1 to the innermost circumference of the second reproducing side (side B). After the transferring movement is completed, spindle motor 50 is reversely rotated while performing the identical operation to the reproducing of side A.

In FIG. 1B as in FIG. 1A, respective operations of spindle motor 50, pickup 60, and feed motor 70 are each controlled to reproduce from the innermost circumference of downward side. However, since the downward side is detected as the second reproducing side by read-in information included on the downward side, pickup 60 is transferred to the innermost circumference of the upward side along pickup transfer 1. Then, reproduction is performed from the innermost circumference to the outermost circumference of disc 80 while reversely rotating spindle motor 50. When the information on the outermost circumference of the upward side is picked up, pickup 60 is transferred to the innermost circumference of the downward side, and reversing the rotation of spindle motor 50. Thereafter, the reproducing operation proceeds. If the STOP key is pressed or reproduction is completed during the control of the reproducing operation, feed motor 70 is controlled to move pickup 60 to the position on the downward side's innermost circumference of disc 80.

However, if the power is turned off, pickup 60 stays at the position it was just before the reproducing operation ceased. Therefore, upon power-up, feed motor 70 requires sufficient drive current for the transfer of pickup 60. Moreover, with disc 80 seated as illustrated in FIG. 1B, pickup 60 must be transferred from the starting point of the reproducing operation while controlling the rotation direction of spindle motor 50. This retards the reproducing time and increases power consumption.

SUMMARY OF THE INVENTION

Accordingly, an object of the present invention is to provide a circuit for controlling an optical pickup position, which precisely detects and controls the position of a pickup.

Another object of the present invention is to provide a circuit for controlling an optical pickup position, which precisely positions the pickup on the side desired to be reproduced first, thereby quickly starting the reproducing operation.

Still another object of the present invention is to provide a circuit for controlling an optical pickup position, which positions the pickup on the innermost circumference of the reproducing side of a disc upon stopping reproduction.

To accomplish these objects, a circuit for controlling an optical pickup position in an optical disc reproducing apparatus is provided, wherein a user recognizes the position of the pickup which is used to pickup information from a disc with information on both sides thereof, by recognizing whether the pickup faces the upward or downward side of the disc when the power is applied.

To achieve other objects according to the present invention, the circuit for controlling an optical pickup position further comprises means which are added for supplying power to a feed motor so as to position the pickup on the innermost circumference of reproducing side when reproducing stops.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 2:
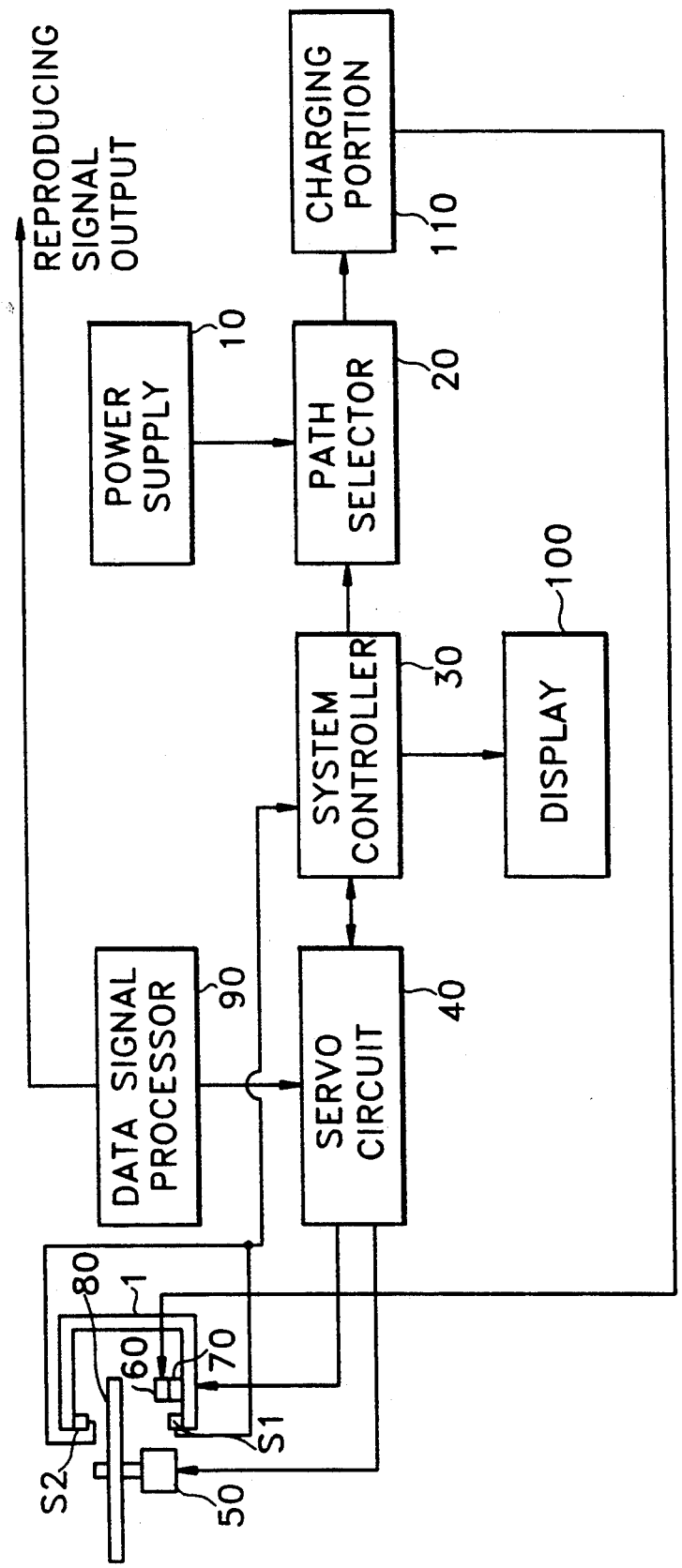
FIG. 2 is a block diagram showing a circuit for controlling an optical pickup position according to the present invention.

Referring to FIG. 2, a circuit for controlling the optical pickup position of the present invention is composed of: a disc 80 with information on both sides; a U-shaped pickup transfer 1 centering around disc 80; a spindle motor 50 positioned below disc 80; a feed motor 70 and pickup 60, both arranged below disc 80 and on the inner portion of pickup transfer 1; a plurality of switches S1 and S2 provided at both ends of the inside of the pickup transfer 1, in the same manner as the feed motor 70 and the pickup; a system controller 30; a servo circuit 40 connected in the midst of feed motor 70, spindle motor 50, pickup 60, and system controller 30; a display 100 whose input is connected to the outputs of system controller 30; a power supply 10; a path selector 20 whose input is connected to the power supply 10 and the output of system controller 30; and a charging portion 110 connected between path selector 20 and feed motor 70.

Figure 3:
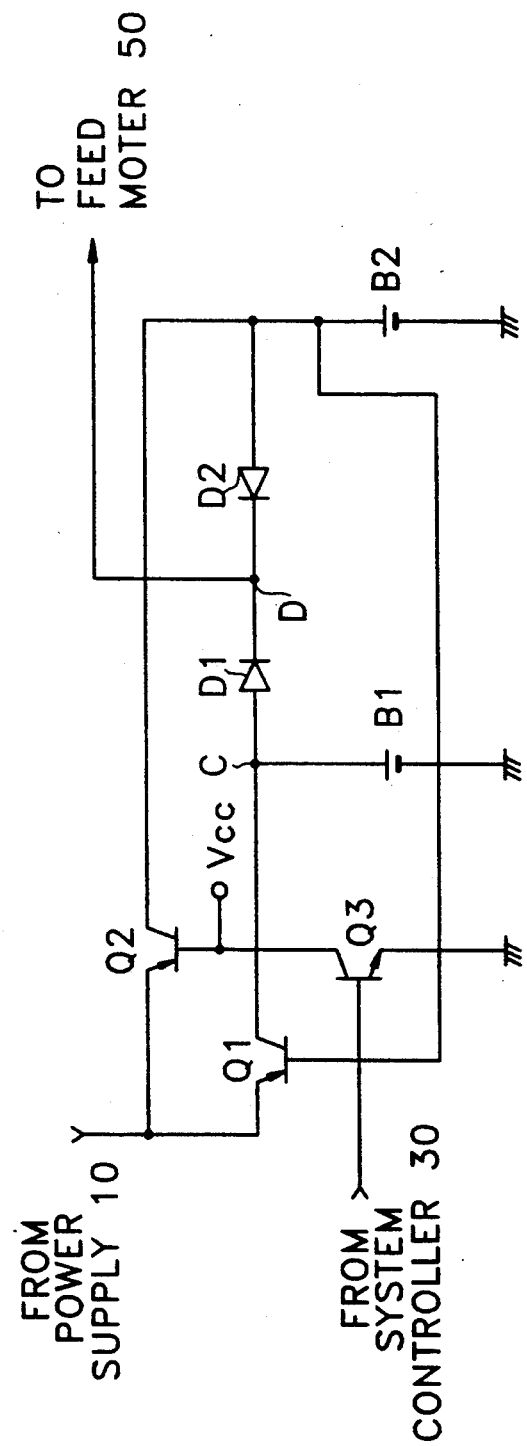
FIG. 3 is a circuit diagram showing an embodiment of the path selector and charger in FIG. 2.

FIG. 3 is an embodiment of the circuitry of the path selector 20 and the charging portion 110 in FIG. 2, which includes first and second transistors Q1 and Q2 whose emitters are each connected to the output of power supply 10; a first diode D1 connected between the collector of the first transistor Q1 and feed motor 70; a first charger B1 connected between a contact point C and ground; a third transistor Q3 which is connected to the base of second transistor Q2 at the contact point of a supply voltage Vcc and its collector, and whose emitter is grounded, and with its base controlled by system controller 30; a second charger B2 connected between the collector of second transistor Q2 and ground; and a second diode D2 connected between second charger B2 and a contact point D. Additionally, the base of first transistor Q1 is connected to the point between second diode D2 and second charger B2. Here, capacitors may be used in lieu of the first and second chargers B1 and B2.

Now, the operation of the present invention will be described with reference to FIGS. 2 and 3.

Figure 1A:
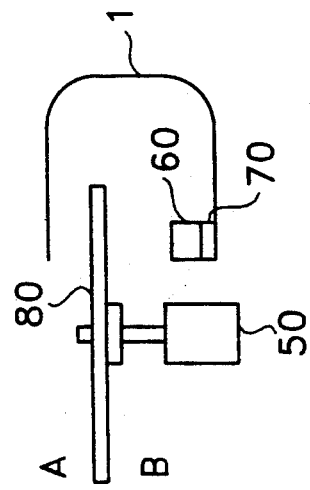
FIG. 1A shows a side view of a conventional U-shaped pickup transfer centering around an optical disc, wherein the first reproducing side A of the disc is facing downward.
Figure 1B:
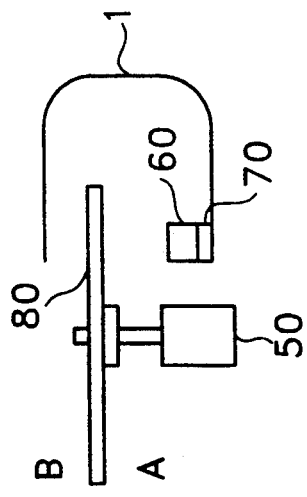
FIG. 1B shows a side view of a conventional U-shaped pickup transfer centering around an optical disc, wherein the second reproducing side B of the disc is facing downward.

To begin with, feed motor 70, pickup 60, and spindle motor 50 centered on disc 80 are constructed conventionally, and perform the same operations illustrated in FIG. 1. The information picked up from disc 80 by pickup 60 is processed by waveform-shaping, demodulated and then digitized to be reproduced along a picture display (not shown) in the data signal processor 90 which is also similar to the conventional one. Power supply 10 supplies the power required for operating system, and servo circuit 40 controlled by system controller 30 controls spindle motor 50, feed motor 70, and pickup 60, which are similar to those of conventional devices.

When the power is turned on, feed motor 70 moves pickup 60 to the closer end of pickup transfer 1, independent of the seating of the disc. This movement is directed toward the innermost circumference while seating the disc, and switches the corresponding switch of first and second switches S1 and S2 provided at both ends of pickup transfer 1. That is, when pickup 60 is positioned below disc 80, first switch S1 is switched; otherwise, second switch S2 is switched. The result of the switching is supplied to system controller 30 which displays the result on display 100 to let the user know the present position of the pickup. At the same time, system controller 30 also applies a control signal to path selector 20, so that a path is determined to connect the corresponding charger from either of two chargers in charging portion 110 to the output of power supply 10. Here, a light emitting diode fixed to the upper and lower surfaces of the front panel, a digitron, or a picture display may be substituted for display 100.

In the normal reproducing mode, charging portion 110 is charged by power supply 10. When the power is turned off, the charged current discharges through feed motor 70, thus supplying power to pickup 60 and moving it to a predetermined position. In the conventional technique, since the pickup should be moved to the innermost circumference of downward side as described above, a charger of greater capacitance is used to supply the power to move pickup 60 from the innermost circumference of the upward side to the innermost circumference of the downward side. In the meantime, separate chargers B1 and B2 are provided for the upward and downward sides of disc 80 according to the present invention. As shown in FIG. 3, the first charger B1 corresponds to the downward side and the second charger B2 to the upward side. Therefore, when the power is turned off, feed motor 70 transfers pickup 60 to the innermost circumference of the side being reproduced, powered by the discharge current from the corresponding charger. However, after the reproducing is successively performed for one side, the discharge of the charger charged during reproducing the one side is ignored and, concurrently, the pickup 60 is transferred to the other side to switch the switch mounted on the end of pickup transfer 1. Accordingly, system controller 30 applies the control signal to path selector 20 by the process described above, so that a path is selected, allowing the charger for the side yet to be reproduced to be charged.

In more detail, using optical disc 80 as a reference, the corresponding charger is first charger B1 when the downward side is reproduced, and second charger B2 corresponds to the case when the upward side is reproduced. The control signal from system controller 30 is set to output low logic when the pickup 60 is below the downward side (when first switch S1 is switched), or high logic when pickup 60 is above the upward side (when second switch S2 is switched) in accordance with the switching signals from first and second switches S1 and S2. Therefore, since the signal output from the system controller 30 is low during the reproducing of the downward side, third transistor Q3 is turned off, which results in turning off the second transistor Q2, thereby blocking the conduction path between second charger B2 and power supply 10. With power to second charger B2 cut off, the signal to the base of first transistor Q1 becomes a logic low, turning it on. By this operation, current from power supply 10 charges first charger B1 through first transistor Q1 while reproducing the downward side. At this time, first diode D1 is used for current limiting, which allows the voltage at contact point C to be applied to the first charger B1 only. After reproducing the downward side, if the reproducing operation is stopped without performing successive reproducing, the charge in first charger B1 controls the operation of feed motor 70 through first diode D1. While this operation takes place, the second diode D2 blocks the current discharged through first diode D1 so that it flows out to the feed motor 70 only.

However, when the reproducing is successively performed, since pickup 60 is transferred to the upward side along pickup transfer 1, the signal from system controller 30 becomes a logic high. The third transistor Q3 then conducts, which bypasses the supply voltage Vcc. This also turns on second transistor Q2 to form a conduction path between power supply 10 and second charger B2, starting its charging operation. The charging operation of second charger B2 turns off first transistor Q1, and the path which had communicated to first charger B1 is blocked, stopping its charging operation. At this time, the signal discharged from first charger B1 to feed motor 70 is lower than the power which transfers pickup 60 along pickup transfer 1, and thus ignored.

When the operation is stopped during the reproducing of the upward side, the charge in second charger B2 is output to feed motor 70 through second diode D2, and the similar operation to the aforesaid reproducing stop mode is performed. Therefore, after stopping the reproducing of the upward side, pickup 60 becomes positioned on the upward side to repeat the reproducing operation, so that the reproducing is performed from the innermost circumference to the outermost circumference of side B.

Returning to FIG. 2, when the power is applied, after the operations of feed motor 70, pickup 60, and first and second switches S1 and S2 are performed as described above, and as soon as the reproducing mode is set along the key input means (not shown), the pickup 60 reads out from the read-in region of disc 80. Here, if disc 80 is not seated, read-in region of disc 80. Here, if disc 80 is not seated, the operation stops. Accordingly, since the user is already aware of which side of the disc is facing the pickup 60 upon inserting a new disc, the first reproducing side can be seated so as to face pickup 60. Meanwhile, if the disc is seated, the reproducing mode is performed in the conventional way.

As described above, the present invention can provide an optical disc reproducing apparatus for reproducing information from a disc which has information on both sides, wherein the user recognizes the position of the pickup to make the correct seating of the disc, which reduces the loss of time to discriminate the first reproducing side during successive reproducing. In addition to this, while the power is turned off, the charger for supplying the power required for driving the feed motor, is separately provided to the upper and lower surfaces of the pickup transfer, so that the pickup is moved to a position on the innermost circumference of the reproducing side. Therefore, power consumption can be economized.

What is claimed is:

1. A circuit for controlling optical pickup position in an optical disc reproducing apparatus, said circuit comprising:
    pickup means for reproducing information from a disc having information recorded on a first side and a second side, opposite to said first side, of said disc;
    pickup transferring means for providing a transfer path for said pickup means between facing said first side and facing said second side of said disc;
    a feed motor for controlling movement of said pickup means along said pickup transferring means;
    pickup position detecting means mounted on inner ends of said pickup transferring means for detecting whether said pickup means faces one of said first side and said second side of said disc;
    display means for displaying a result of position detection by said pickup position detecting means; and
    a charging portion for supplying electrical power to said feed motor immediately after said optical disc reproducing system is turned off to transfer said pickup means to an innermost circumference of a last side of said disc, said last side being a one of said first side and said second side said pickup means is facing when said optical disc reproducing apparatus is turned off, said charging portion comprising separate first charging means corresponding to said first side and second charging means corresponding to said second side of said disc.

2. A circuit for controlling optical pickup position as claimed in claim 1, wherein said pickup position detecting means comprises switches switched by movement of said feed motor.

3. A circuit for controlling optical pickup position as claimed in claim 2, wherein said feed motor moves from an outermost circumference to an innermost circumference of said disc.

4. A circuit for controlling optical pickup position in an optical disc reproducing apparatus, said circuit comprising:
    pickup means for reproducing information from a disc having information recorded on a first side and a second side, opposite to said first side, of said disc;
    pickup transferring means for providing a transfer path for said pickup means between facing said first side and facing said second side of said disc;
    a feed motor for controlling movement of said pickup means along said pickup transferring means; and
    a charging portion for supplying electrical power to said feed motor after said optical disc reproducing apparatus is turned off to transfer said pickup means to face an innermost circumference of one of said first side and said second side of said disc, said charging portion comprising separate first charging means corresponding to said first side and second charging means corresponding to said second side of said disc.

5. A circuit for controlling optical pickup position as claimed in claim 4, further comprising:
    pickup position detecting means mounted on inner ends of said pickup transferring means for detecting whether said pickup means faces one of said first side and said second side of said disc; and
    display means for displaying a result of position detection by said pickup position detecting mean.

6. A circuit for controlling an optical pickup position in an optical disc reproducing apparatus, said circuit comprising:
    pickup means for picking up reproducing information from a disc having information recorded on a first side and second side, opposite said first side, of said disc;
    pickup transferring means for providing a transfer path for said pickup means between facing said first side and facing said second side of said disc;
    pickup position detecting means mounted on inner ends of said pickup transferring means for detecting whether said pickup means faces said first side or said second side of said disc;
    displaying means for displaying a result of position detection by said pickup position detecting means; and
    a charging portion for supplying electrical power to said feed motor to transfer said pickup means to an innermost circumference of a current side, said current side being one of said first side or said second side when the power to said optical disc reproducing apparatus is turned off, said charging portion comprising separate first charging means corresponding to said first side and second charging means corresponding to said second side of said disc.

7. A circuit for controlling an optical pickup position in an optical disc reproducing apparatus, said circuit comprising:
    pickup means for picking up reproducing information from a disc having information recorded on a first side and second side, opposite said first side, of said disc;

pickup transferring means for providing a transfer path for said pickup means between said first side and said second side of said disc;

pickup position detecting means mounted on inner ends of said pickup transferring means for detecting whether said pickup means faces said first side or said second side of said disc;

displaying means for displaying a result of position detection by said pickup position detecting means; and a charging portion for supplying power to said feed motor to transfer said pickup means to an innermost circumference of a reproducing side when the power to said optical disc reproducing apparatus is turned off, wherein said charging portion is provided with separate first and second charging means which correspond to said first side and said second side of said disc, respectively.

8. A circuit for controlling the optical pickup position as claimed in claim 7, wherein said first charging means and said second charging means comprise a first charging battery and a second charging battery, respectively.

9. A circuit for controlling the optical pickup position as claimed in claim 7, wherein said first charging means and said second charging means comprise a first capacitor and a second capacitor, respectively.

10. A circuit for controlling the optical pickup position as claimed in claim 8, further comprising path selecting means for selectively charging one of said first charging means and said second charging means in accordance with an output signal of said pickup position detecting means.

11. A circuit for controlling the optical pickup position as claimed in claim 10, wherein said pickup position detecting means comprises switches switched by movement of said feed motor.

12. A circuit for controlling the optical pickup position as claimed in claim 11, wherein said feed motor moves from an outermost circumference to an innermost circumference of said disc.

13. A circuit for controlling the optical pickup position as claimed in claim 10, wherein said feed motor controls said pickup means to move to an innermost circumference of said disc by power supplied from one of said first charging means and said second charging means.

14. A circuit for controlling an optical pickup position in an optical disc reproducing apparatus, said circuit comprising:

pickup means for reproducing information recorded on a first side and a second side of a optical disc, said second side opposing said first side;

pickup transferring means for providing a transfer path for said pickup means between facing said first side and facing said second side of said disc;

a feed motor for controlling movement of said pickup means along said pickup transferring means; and electrical power storage means for supplying electrical power to said feed motor immediately after said optical disc reproducing system is turned off to transfer said pickup means to a home position, said electrical power storage means comprising separate first power storage means and second power storage means for respectively driving said feed motor to transfer said pickup means to said innermost circumference of said first side and said innermost circumference of said second side.

15. A circuit as claimed in claim 14, further comprising:

pickup position detecting means for generating current side signals indicating whether said pickup means faces one of said first side and said second side of said disc; and said electrical power storage means supplying said electrical power from one of said first power storage means and said second power storage means in response to said current side signals so as to transfer said pickup means to said home position, said home position determined in response to said current side signals.

16. A circuit as claimed in claim 14, wherein said electrical power storage means supplies power to said feed motor after said optical disc reproducing apparatus is turned off to transfer said pickup means to face an innermost circumference of said first side if said pickup position detecting means determines said pickup means is facing said first side when said optical disc reproducing apparatus is turned off and supplies power to said feed motor after said optical disc reproducing apparatus is turned off to transfer said pickup means to face an innermost circumference of said second side if said pickup position detecting means determines said pickup means faces said second side when said optical disc reproducing apparatus is turned off.

17. A circuit as claimed in claim 16, wherein said first power storage means and said second power storage means comprise a first battery and a second battery, respectively.

18. A circuit as claimed in claim 16, wherein said first power storage means and said second power storage means comprise a first capacitor and a second capacitor, respectively.

19. A circuit as claimed in claim 14, wherein said first power storage means and said second power storage means comprise a first battery and a second battery, respectively.

20. A circuit as claimed in claim 14, wherein said first power storage means and said second power storage means comprise a first capacitor and a second capacitor, respectively.

* * * * *